Patented Aug. 5, 1941

2,251,687

UNITED STATES PATENT OFFICE 2,251,687

BRICK MANUFACTURE

Charles L. Norton, Boston, Mass., assignor to The Babcock & Wilcox Company, Newark, N. J., a corporation of New Jersey No Drawing. Application February 8, 1929, Serial No. 338,621

21 Claims. (Cl. 25—156)

My invention relates to the manufacture of heat insulating, refractory brick, which includes standard rectangular brick shapes and such other and special shapes as may be required. The objects are to produce brick which shall be effectively heat insulating through a range of temperatures up to the maximum which the brick structure can endure, and be also refractory to heat, of mechanical strength amply high to sustain handling, shipping, and all usual manipulation, of light weight, and subject to only slight and tolerable shrinkage under the temperature changes of use.

I attain some of these objects by means of abundant, uniformly dispersed voids of sizes from nearly to quite microscopic magnitudes, in the brick structure; this, by producing a very light weight brick reduces the maximum load to be sustained by a brick in a furnace or kiln lining or insulation layer, and by reducing the heat-conductive cross section of the solid material and interposing non-convective minute gas-filled cells, imparts low thermal conductivity to the brick as a whole.

The method by which I prepare brick material and construct brick shapes for firing applies to a miscellany of earthy brick materials; the process of burning such shapes after preparation, which in my invention is distinguished from heretofore existing brick burning methods, applies more particularly to earthy brick materials such as kaolin which suffer considerable shrinkage in burning.

Cellular brick, properly in the category of thermal insulators, have been made in sundry ways; my new method provides a brick structure in which the voids or cells are more uniform in size, smaller, and more uniformly distributed, than has heretofore been produced, as far as I am aware. Moreover, it is possible by my new method to produce a brick in which the volumetric ratio of included voids to solid material is very large.

As examples of earthy materials adapted to brick manufacture, alike amenable to the preparatory steps of the brick making process, but requiring diverse treatment during burning, take kaolin and diatomaceous earth.

A mixture of materials which has proved effective, in the case of kaolin, is 40% kaolin, 20% grog, made from burned brick of the same kind as that produced by my process, and 40% wood flour. (Percentages are by weight.) Grind and mix the kaolin and grog with water, to pass a 38 mesh screen. Then mix these pulverized earthy materials with the wood flour, all of which should be fine enough to pass a 35 mesh screen, and most of it to pass a 48 mesh screen. About 200 pounds of water to 100 pounds of dry mix will be found suitable to make a slip of the right consistency to pour into brick molds. Froth this water slip by beating and stirring vigorously or by blowing air through the vessel containing it, or by both blowing and beating simultaneously, until the whole is uniformly filled and distended with air bubbles. Air, of course, is representative of any gas which may be employed, and is the obviously economical gas to use.

The wood flour in this mix forms nuclei with which the air bubbles are associated. Up to a roughly determinable point, the finer the organic, bubble-nucleating material, the smaller will be the bubbles in the froth, after this, further comminution of the nucleus particles does not appear to have any effect. The use of organic material here, as in earlier cellular brick making, implies the ultimate combustion of such material during the process of burning the brick, but in this process of mine has functional significance also in the nucleation and preliminary retention of froth bubbles. For this reason, organic material which is absorbent of water, and swells in water, as for instance starch or wheat flour, is to be avoided, and water-insoluble, finely divided organic material, such as wood flour, is to be employed.

When the slip is thoroughly frothed, it should be poured immediately into filter molds, so that removal of excess water from the mud surrounding the bubbles, and consequent thickening of the slip material constituting the walls or partitions between bubbles shall proceed before the froth-bubbles have time to collapse, and their air to escape, to any serious or material extent. The wood flour particles at the initial stage function to retard bubble-bursting and general subsidence of the froth from that cause, but are effective only to retard it. Removal of excess water by filtration (which should be accelerated by pressure differential, preferably by a combination of partial vacuum on the filter bed side and mold-head pressure on the top), quickly causes the slip mixture or mud to thicken to such consistency that the imprisonment of the froth bubbles is made permanent, the whole brick shape being then a set froth, containing a very high volumetric percentage of froth voids, of very small magnitude, fairly uniform in size, and uniformly distributed.

Filtration soon makes the brick shapes stiff enough to handle, and these are set in a shed or drying rack and dried at about 200° F. for from 12 to 18 hours. The shods should be oiled to prevent the shapes from sticking.

Set froth brick shapes may also be made of a mix of diatomaceous (or infusorial) earth, and wood flour; take, for instance a mix of 40% wood flour and 60% infusorial earth with from 1.7 to 1.85 pounds of water to each pound of the dry mix, and froth this water slip by beating or blowing, or both. With infusorial earth, prolonging the frothing operation produces a progressively lighter and finer froth. The limits of water proportion proper for effective froth formation are narrower than in the case of a kaolin mix. The water suspension of infusorial earth in the frothed slip, though fluid enough to pour readily into molds, presently thickens in consistency and stiffens without removal of water as by filtration, and the shapes can be handled for drying. It is also possible to mold this frothed mixture by the ordinary slip-molding process. I believe that the stiffening stage of preparation of brick shapes for drying and subsequent burning is due to fundamentally similar changes in physical characteristic in both the foregoing instances. The change is that of consistency of the material which constitutes the bubble-containing liquid mud part of the frothy mass; a change characterized by increase in the plastic stiffness of that material, which depends on the mobility, in response to pressure-differential, of the solid particles comprised in it. In the case of a kaolin slip, elimination of part of the water by filtration reduces the total volume of the material around and between the bubbles in the froth, with accompanying shrinkage of volume of the whole mass. This total shrinkage is largely in the liquid mud part of the mass in which the quantitative ratio of dispersed solid particles to the water increases in value as the water component is reduced, the included bubbles substantially retaining their aggregate volume, with but minor loss by bursting or escape of individual bubbles. In the liquid mud part, therefore, the solids (kaolin and wood flour) become more closely packed as the water, which is the medium in which plastic mobility of such solids is manifested, is reduced.

In the infusorial earth slip, the plastic stiffens, in other words, the reciprocal of mobility of the solids in response to pressure-differential is increased by an internal change which tends to swell rather than contract, the solid particle components of the liquid mud which surrounds the bubbles. Infusorial earth is originally derived from marine organisms, and a small residuum of the organic matter of which their bodies were in part composed, remains in the earth. It may be this organic residue (which functions by combustion when infusorial, or diatomaceous, earth is calcined,) which determines by its behavior as an organic, water-absorbent colloid, the stiffening or thickening effect in the slip of brick material, which in turn is responsible for a lower degree of plastic mobility of the solid particles. Be this the true explanation or not, the stiffening of the frothed material in both the above described examples is due to decrease in the ratio value between the water and the particles dispersed in the water, of the bubble-surrounding mud. In the case of kaolin slip, this decrease in ratio-value is caused by abstraction of part of the water, the individual solid particles remaining unchanged in size; in the case of infusorial earth slip, it is caused by swelling of the dispersed particles which, by incorporating in their own bodies a part of the surrounding water, reduce the quantity of water which can function as a medium of mobility for the particles themselves.

In respect, therefore, to the formation of a gas frothed slip, with froth bubbles nucleated upon material such as wood flour, setting the froth structure by thickening the consistency of the bubble-surrounding material, and thus providing a brick shape of fine cellular dispersion, this method is alike applicable to a miscellany of earthy brick materials, as exemplified by kaolin and infusorial earth. These principal solid materials can, either of them, be qualified by admixture of such ingredients as pulverized grog, which, in the case of infusorial earth brick may be made of fragments of already burned brick of the same kind. In all instances, also, the proportions of organic bubble nucleating powder or granules to the earthy material are susceptible of considerable variation.

In drying and burning, however, the kaolin shapes require treatment different from such shapes as are composed chiefly, in their brick material, of infusorial earth. The latter can safely be dried more rapidly than kaolin shapes, and at higher temperatures, yet below that at which combustion of the organic inclusion takes place. Infusorial earth brick can be burned more rapidly than kaolin brick, and without providing a reducing atmosphere which, as hereinbelow explained, is highly desirable and practically indispensable during certain stages of kaolin brick burning. On the other hand, after burning, infusorial earth brick should be more slowly cooled than is necessary with kaolin brick. In the case of kaolin brick shapes, made of stiffened froth as above described, after the shapes are dried, they are burned in the following manner.

The brick shapes should be stood on end in the kiln, so as to minimize the effect of dragging on the supporting surface during the shrinkage which is inevitable. At or before the application of temperature at which, in the presence of oxygen, combustion of the organic inclusion of wood flour would begin, a reducing atmosphere is produced in the kiln, and maintained until the rate of shrinkage of the kaolin has passed its maximum and is relatively low, the shrinkage being due to loss of water of combination, which begins at or about 1100° F. As it is imperative to control the rate of temperature rise and therefore the rate of shrinkage, combustion of the organic inclusion, which would raise the temperature rapidly, and take its rate out of control, is to be avoided until the rate of shrinkage is reduced.

As no appreciable shrinkage sets in below about 1100° F. the kiln temperature can be raised at a fairly rapid rate up to this point, provided a reducing atmosphere is maintained; say in an hour or slightly less. Thereafter, and until a temperature of about 1700° is reached, the rate of temperature rise is retarded, being held at about 100° F. increase per hour. At or about 2100° F., reducing atmosphere is replaced by an oxidizing atmosphere, and the carbonized particles of organic inclusion eliminated by combustion. By this time the rate of shrinkage of the brick will be relatively low, and the acceleration of temperature rise by burning of the carbon will have no detrimental effect. The final temperature of burning will be in the neighborhood of 2800° F. after which the brick are cooled, and when cool are trimmed by face grinding in the usual manner.

Standard size brick (9 x 4½ x 2½ inches), made in the manner above described will average 1½ pounds weight, i. e. a density of 25.59 lbs. per cubic foot. Their thermal conductivity runs from 1.4 (B. t. u. per square foot area per one inch thickness, per 1° F. per hour) at 400° F. to 3.1 at 2000° F. Their reheat shrinkage when held at 2550° F. for five hours is 0.4%, which is well within tolerable limits. If one per cent shrinkage be tolerated, these brick can be used satisfactorily at temperatures as high as 2800° F. Their crushing strength is relatively low, about 66 pounds per square inch; this can be raised by using clay having a lower vitrifying temperature, with a compensating sacrifice of low density, thermal insulation and refractoriness. A crushing strength of 66 pounds per square inch is, however, sufficient for practical purposes, and provides a fair margin of safety.

Insulating brick of standard size made from a froth structure of infusorial earth and wood flour as above described, may be made to weigh one pound each, i. e., a density of 17.06 lbs. per cubic foot, or even slightly less, but, from the point of view of conductivity there does not seem to be any material advantage in frothing the slip material more than is necessary to make standard brick weighing one and a quarter pounds each, i. e. a density of 21.33 lbs. per cubic foot. These bricks can be molded from the stiffened froth, (which does not require, and is indeed ill suited to, elimination of water by filtration) on a soft mud brick machine. They will probably be found better adapted to service as an insulating backing for high refractory brick in furnaces and the like, than as inner linings.

The proportions of earthy brick material and finely divided organic material above given are intended to serve only as good workable formulae. According to the purposes of the brick maker these proportions may be considerably varied. The inclusion of a minor proportion of grog is also optional; it facilitates filtration in the case of the kaolin slip, and increases strength and stability in both kaolin and infusorial earth brick; but, these advantages are proportionately offset by decrease in other values, such as lightness and insulating efficiency in the finished product. Again, variation in ingredients and their proportion will be determined by the judgment of the manufacturer.

In the claims, the phrase "highly porous" is intended to define burnt refractory shapes having a very large volumetric ratio of included voids to solid material.

I claim:

1. A heat insulating body comprising refractory material rendered highly porous by included minute voids, one group thereof created by aeration and another group created by elimination of solid particles.

2. A heat insulating body comprising refractory material rendered highly porous by included minute voids, one group thereof created by aeration, and another group created by oxidation of solid particles.

3. A heat insulating body comprising refractory material rendered highly porous by included minute voids, one group thereof created by aeration, and another group created by oxidation of solid particles, the voids of the two groups being comparable in magnitude, number and dispersion.

4. A heat insulating building block comprising refractory material rendered highly porous by included minute voids, one group thereof created by oxidation of solid particles during burning of the shape to render it refractory, and the other group thereof being created by aeration during the formation stages of the shape, and having a density approximating the range of 18 to 25 pounds per cubic foot.

5. An article of manufacture comprising a building block molded of an aerated liquid mixture of refractory and organic particles subsequently deliquidized substantially without deaeration and burned at a final temperature determining its refractory characteristics and during which the organic particles are eliminated leaving minute voids in addition to those created by aeration.

6. An article of manufacture comprising a building block molded of an aerated liquid mixture of refractory and organic particles subsequently deliquidized by pressure filtration substantially without deaeration and burned at a final temperature determining its refractory characteristics, and during which the organic particles are eliminated, leaving minute voids in addition to those created by aeration, thereby producing a highly porous refractory heat insulating block.

7. An article of manufacture comprising a building block molded of an aerated liquid mixture of refractory and organic particles subsequently deliquidized substantially without deaeration and burned at a final temperature determining its refractory characteristics, and during which the organic particles are eliminated leaving minute voids at least comparable in magnitude, number and dispersion to the voids created by aeration.

8. An article of manufacture comprising a building block molded of an aerated liquid mixture of finely ground clay, precalcined porous grog and combustible organic particles subsequently deliquidized substantially without deaeration and burned at a final temperature determining its refractory characteristics, and during which the organic particles are eliminated leaving minute voids in addition to the voids created by aeration.

9. The method of manufacturing a building block having refractory and heat insulating characteristics, and which includes the steps of forming and molding an intimate highly aerated liquid mixture of refractory and combustible organic particles, deliquidizing the mixture while substantially preserving its aerated condition, and then burning the block to establish its refractory characteristics and eliminate the organic particles thereby creating minute voids in addition to those created by aeration.

10. The method of manufacturing a building block having refractory and heat insulating characteristics, and which includes the steps of forming and molding an intimate highly aerated liquid mixture of refractory and combustible organic particles, deliquidizing the mixture while substantially preserving its aerated condition, burning the block in a reducing atmosphere to carbonize the organic particles, and then burning the block in an oxidizing atmosphere to establish its refractory characteristics and eliminate the carbonized organic particles thereby creating minute voids in addition to those created by aeration.

11. The method of manufacturing a building block having refractory and heat insulating characteristics, and which includes the steps of forming and molding an intimate highly aerated liquid mixture of refractory and combustible organic particles sized in the order of magnitude of the aerating bubbles, deliquidizing the mixture while substantially preserving its aerated condition, and then burning the block to establish its refractory characteristics and eliminate the organic particles thereby creating minute voids at least comparable in magnitude, number and disperson to the voids created by aeration.

12. The method of manufacturing a building block having refractory and heat insulating characteristics, and which includes the steps of forming and molding an intimate highly aerated liquid mixture of minute refractory particles, a portion of which has been pre-burned, and combustible organic particles all sized in order of magnitude of the aerating bubbles, deliquidizing the mixture by pressure filtration while substantially preserving its aerated condition, and then burning the block at a final temperature determining its refractory characteristics, and during which the organic particles are eliminated leaving minute voids in addition to the voids created by aeration.

13. The method of forming a highly porous body of low thermal conductivity including the steps of mixing minute refractory particles with a liquid in proportions to provide a membrane forming fluid, adding thereto combustible membrane reinforcing bodies, aerating the composite mixture whereby voids are created with the reinforcing bodies sustaining the integrity of the fluid membrane walls, and then indurating the membranes with a heat sufficient to eliminate the membrane reinforcing bodies whereby additional voids are formed.

14. A process of manufacturing shaped, lightweight, ceramic products which comprises forming a flowable mixture of castable consistency including water, an argillaceous material, and a finely divided combustible material, casting the mixture into a mold, drying the casting, and firing the dried casting to burn out the combustible material and develop a ceramic bond in the mass.

15. The method of manufacturing a building block, which includes the steps of mixing permanent solids with wetting liquids, then coincidentally molding and deliquidizing a mass thereof by pressure filtration, and then producing permanency in the molded structure.

16. A light weight burnt ceramic shape consisting mainly of highly porous indurated argillaceous material and having a density of about 25 pounds per cubic foot and capable of use as a heat insulator at temperatures in excess of 1600° F., and including a multiplicity of minute voids created by aeration and by elimination of organic material during its manufacture.

17. A light weight burnt ceramic shape consisting substantially entirely of porous indurated argillaceous material and having a very large volumetric ratio of included voids to solid material and capable of use as an insulating firebrick at temperatures in excess of 2500° F.

18. The method of manufacturing light weight burnt ceramic shapes which includes molding a slip containing argillaceous material, combustible organic particles and water into the desired shapes, and firing the shapes formed under kiln conditions minimizing combustion of the organic particles until the rate of shrinkage of the argillaceous material has passed its maximum, and subsequently firing the shapes in an oxidizing atmosphere to eliminate the organic particles and indurate the argillaceous material.

19. The method of manufacturing light weight burnt ceramic shapes which includes aerating a mixture including argillaceous material, combustible organic particles and water to form a frothed slip, molding the slip into the desired shapes, and firing the shapes formed under kiln conditions minimizing combustion of the organic particles until the rate of shrinkage of the argillaceous material has passed its maximum, and subsequently firing the shapes in an oxidizing atmosphere to eliminate the organic particles and indurate the argillaceous material.

20. The method of manufacturing light weight burnt ceramic shapes which includes aerating a mixture including refractory material, combustible organic particles and an amount of water substantially in excess of the dry materials by weight to form a frothed slip, molding the slip into the desired shapes without substantially affecting the aerated condition, and firing the shapes formed under kiln conditions eliminating the organic particles and indurating the refractory material to create a multiplicity of minute voids in addition to those created by aeration.

21. The method of manufacturing light weight burnt ceramic shapes which includes aerating a mixture including argillaceous material, combustible organic particles and an amount of water substantially in excess of the dry materials by weight to form a frothed slip, molding and deliquidizing the slip by pressure filtration into the desired shapes without substantially affecting the aerated condition, and firing the shapes formed under kiln conditions eliminating the organic particles and indurating the argillaceous material.

CHARLES L. NORTON.